United States Patent [19]

Klingel

[11] Patent Number: 4,907,240

[45] Date of Patent: Mar. 6, 1990

[54] DEVICE FOR A POWER LASER

[76] Inventor: Hans Klingel, Teckstrasse 91, 7141 Möglingen, Fed. Rep. of Germany

[21] Appl. No.: 228,726

[22] Filed: Aug. 4, 1988

[30] Foreign Application Priority Data

Oct. 13, 1987 [DE] Fed. Rep. of Germany ....... 3734570

[51] Int. Cl.$^4$ ............................................. H01S 3/22
[52] U.S. Cl. .................................... 372/58; 372/94; 372/107
[58] Field of Search .................... 372/58, 94, 92, 93, 372/107

[56] References Cited

U.S. PATENT DOCUMENTS

| 4,407,583 | 10/1983 | Simms | 372/94 |
|---|---|---|---|
| 4,578,792 | 3/1986 | Hoag | 372/58 |
| 4,602,372 | 7/1986 | Sasaki et al. | 372/58 |
| 4,616,930 | 10/1986 | Martin | 372/94 |
| 4,660,209 | 4/1987 | Osada et al. | 372/58 |
| 4,661,958 | 4/1987 | Bowes et al. | 372/59 |
| 4,709,372 | 11/1987 | Rando et al. | 372/58 |

Primary Examiner—Léon Scott, Jr.

[57] ABSTRACT

A CO2 power laser has beam paths in gas pipelines disposed in a rectangle with a plurality of corner flanges, and an end flange, and through flange that subdivide each gas pipeline. Partial paths of a gas supply device and partial paths of a gas drain device are situated in a star-shaped device between a turbo radial blower and the corner, end and through flanges. The star-shaped device has cavities in which the gas supply and gas drain paths extend.

19 Claims, 3 Drawing Sheets

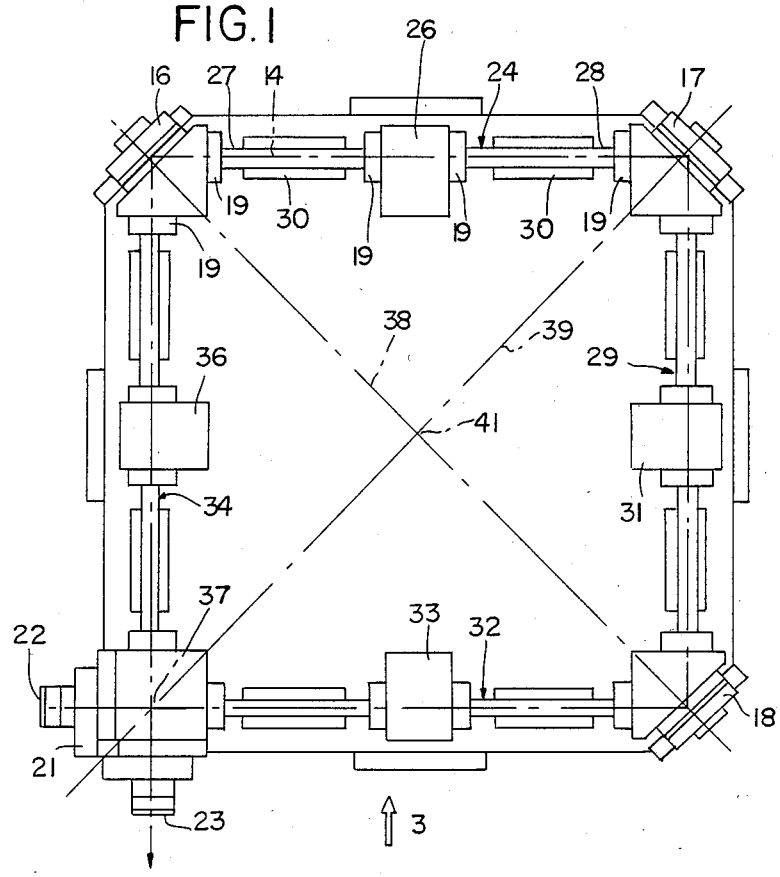
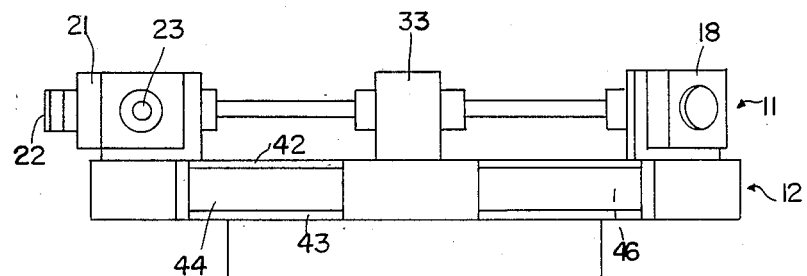

DEVICE FOR A POWER LASER

The invention relates to a device for a CO2 power laser having beam paths disposed in a rectangle.

BACKGROUND OF THE INVENTION

Such a device includes:
intermediate corner flanges and deflecting mirrors in three corner zones,
an end flange, an output mirror and a 180 degree total reflection mirror in a fourth corner zone,
gas pipelines between the intermediate corner flanges and end flange,
HF pumping electrodes on the gas pipelines,
a gas supply device for cooled gas,
a gas draining device for heated gas,
heat exchange devices,
a gas pump connected to the gas supply device and to the gas draining device, and
a base device carrying the intermediate corner flanges and the end flange.

Such a device was disclosed to the Applicants by a leaflet of Messrs. C-E Industrial Lasers, Inc., 32 Cobbel Hill Road, Somerville, Mass. 02143, U.S.A.

The leaflet contains only the above configuration without the gas supply device, the gas drain device, the heat exchange device, the gas pump or the base device. However, these known elements of a CO2 power laser have to be included because it is unimaginable that the laser could have operated for example without a gas pump.

OBJECT AND STATEMENT OF THE INVENTION

The object of the invention is to provide a simply constructed power laser which in terms of power is small yet which manages with thin gas pipelines. According to the invention, this object is achieved by the following features:

(a) a through-flange is connected to each of said gas pipelines and sub-divides the gas pipeline to which it is connected into two pipelines, (b) said gas pipelines form a right-angled rectangle, (c) said gas pump is provided approximately at the intersection of diagonals across said corner zones (d) at least partial paths of said gas supply device and at least partial paths of said gas drain device are situated in a star-shaped device between said turbo-radial blower and said intermediate corner flanges, through-flanges and end flange, (e) said gas pump is a turbo-radial blower that has an axis at a right angle to said star-shaped device, wherein said axis substantially traverses said area of intersection of said diagonals, (f) said star-shaped device has cavities in which said partial paths of said gas supply device and said gas drain device extend, (g) wherein there are provided four partial paths for the supply of gas and four partial paths for gas dispersal, some partial paths extending to said intermediate corner flanges and said end flange and other partial paths extending to said through-flanges, and (h) said turbo-radial blower is at least indirectly flanged onto said star-shaped device.

As a result of the feature group (a), gas can be supplied not only at the end flange and at the intermediate corner flanges. Instead, four further places are provided from which gas can be supplied or dispersed. The power of a laser, as is a well known fact, depends upon how much cooled gas can be supplied.

The feature group (b) provides an assembly which fits well into production line as a handling station. The feature group (c) works along the same lines as group (a). For example, the shortest routes for the gas are obtained from the beam path to the gas pump and back. The feature group (d) operates along the same lines as group (a). The star-shaped connection is the shortest connection and furthermore that which does not favor or disadvantage any area of the beam paths systematically. The feature group (e) works along similar lines as group (a). A turbo-radial blower has a very high rate of delivery. It can be provided close to the beam path where it requires little space. No mechanical output means are needed which would entail relatively long gas drain and supply lines. The blower also fits in symmetrically while this is not the case with rotary piston pumps. Also, when the turbo-radial blower has an axis at a right angle to the star-shaped device there is even less vibration, and one can bring the blower still closer to the table without losing height. Furthermore, it means that the flow paths are even more equally justified. When the axis substantially traverses the area of intersection of the diagonals, the idea of symmetry is completely fulfilled, which means advantages in terms of the loading of the star-shaped device, the gas kinematics and the clear and modular construction. The feature (f) also works on the same lines. Cross-sectionally relatively large, protected, and from the point of view of flow, very favorable partial paths can be provided in the star-shaped device. According to feature group (g), a few cross-sectionally large partial paths can be provided which afford negligible resistance to flow, and provide a clear and equal-entitlement flow pattern. The flanges are at the same time used as distributors for the fresh gas and as collectors for the consumed gas. In fact, distribution takes place in one flange while collection takes place in another, distribution in the third, and so on. According to feature group (h), the partial paths are optimally short and no separate hoses are required.

The following additional advantageous features are disclosed:

Gas pipelines form a square. This further completes the idea of the assembly. Each gas pipeline contributes equally to the laser output, the intermediate corner flanges can be of identical construction, and the essential parts are equally removed from the point of intersection of the diagonals.

Partial paths for gas supply go to the intermediate corner flanges and the end flange, and the partial paths for gas dispersal go to the through-flanges. This ensures that the mirrors are cooled more satisfactorily, being of course located in the intermediate corner flanges while the through flanges receive the hotter gas but are not so critically stressed by heat.

The cavity of the table top has an upper wall and a lower wall that bound the partial paths, and gas-tight partitions extend between the upper and lower walls. This means that the optical bench is used directly to accommodate all the partial paths. An extraordinary amount of space, which is otherwise used for pipelines, can be saved. The partitions strengthen the table, particularly if the whole affair is of welded construction.

The flow resistances of the partial paths for gas supply are equal. As a result, all the gas supply points receive the same quantity of gas.

The flow resistances of the partial paths for gas dispersal are equal. By virtue of this feature, the same amount of gas is discharged at all the gas drain points.

The turbo-radial blower has a pressure chamber or a suction chamber, and the upper wall or the lower wall comprises apertures that open out into the partial paths and are connected to the pressure chamber or suction chamber of the turbo-radial blower. This obviates the provision of conductors in the table as well as from the blower to the table, and the blower can be moved very close to the table.

The turbo-radial blower is flanged to the underneath of the table top. This provides a unit which is easily fitted and removed. Also, the vibration dampers become unnecessary because the blower rotates at very high speeds.

A plurality of apertures for partial paths of gas supply lie on one radius and an aperture for gas dispersal lies in the area of intersection of the diagonals. As a result, the partial paths for gas supply and draining enjoy absolutely equal entitlement and are symmetrical while the cool gas reaches the intermediate corner flanges by the fastest route.

The heat exchange devices comprise first heat exchange devices provided in the table top in partial paths for gas dispersal. By reason of these features, the heat exchange devices can likewise be built into the table so that to this extent no accessory equipment is required. Furthermore, this is favorable for the blower, which runs at full output, because it obtains from the outset cooled gas which also helps the effective life of the blower. Furthermore, the table is also cooled at the same time.

The heat exchange devices comprise second heat exchange devices provided in the table top in partial paths for gas supply. By these features, the gas can be cooled once again shortly before it passes into the beam paths and can bring down again that temperature rise which occurs due to compression of the gas in the blower. Furthermore, larger cooling areas result by providing heat exchange devices in accordance with these and the preceding features.

The turbo-radial blower has a rotor and a housing that has an outlet orifice coaxial with the rotor and aligned with the aperture for gas dispersal. Following these features, the blower is brought as close to the table as is possibly conceivable. No intermediate hoses or expensive packings are required. All that is needed is a central hole in the bottom wall of the table.

The same applies logically to the following features: The turbo-radial blower has a rotor and a housing that has coaxial with the rotor an overpressure chamber directly aligned with the apertures for gas supply. Therefore, the blower is connected directly to the table and can optimize its dual function as an optical bench on the one hand and as a gas distributor on the other.

The turbo-radial blower has a rotary speed in the range of about 10,000 to 150,000 rpm, the gas delivery rate being in the range of about 100 m3/h to 2000 m3/h. This makes it possible to produce a laser in the range from several hundred watts up to a few kilowatts, in fact without the laser in itself undergoing any alteration. Naturally, the pump output must also be increased accordingly. The length of the laser beam may be in the range from 2000 to 3000 mm. In the case of the quadratic configuration, this means that one side may be 60 to 80 cm long, which is very space-saving.

The rotary speed is in the range of about 40,000 to 100,000 rpm, the gas delivery rate being in the range of about 500 m3/h to 1200 m3/h. This provides a preferred working range.

In the case of a 500 W laser, the rotary speed is in the range of about 40,000 rpm plus/minus 20%. These values refer to a 500 W laser so that it is possible to use this as a basis on which to calculate what for instance a 200 W laser or a 1000 W laser would require.

The $CO_2$ power laser comprises an assembly of components rigidly joined to one another to constitute one unit. By reason of these features, a virtually monolithic unit is obtained withoutrality of hoses, conductors, etc. Such an assembly can be easily adjusted, installed, repaired and above all it is possible to work with it easily. As one whole unit, it can be moved into different positions such as for example overhead, vertical, horizontal or the like.

The table top is several millimeters thick. Preferably, the thickness of the table top is in the range of about 50 to 140 mm. These features show values of a table with which it is possible to achieve laser outputs of some 200 W up to a plurality of kilowatts.

The values also show how thin the table top can be.

DESCRIPTION OF THE DRAWINGS

A preferred embodiment of the invention will now be described by way of example. It is shown in the accompanying drawings, in which:

FIG. 1 is a diagrammatic plan view of a horizontal laser,

FIG. 3 is a view according to the arrow 3 in FIG. 1.

DESCRIPTION OF A PREFERRED EMBODIMENT

Figure 2:
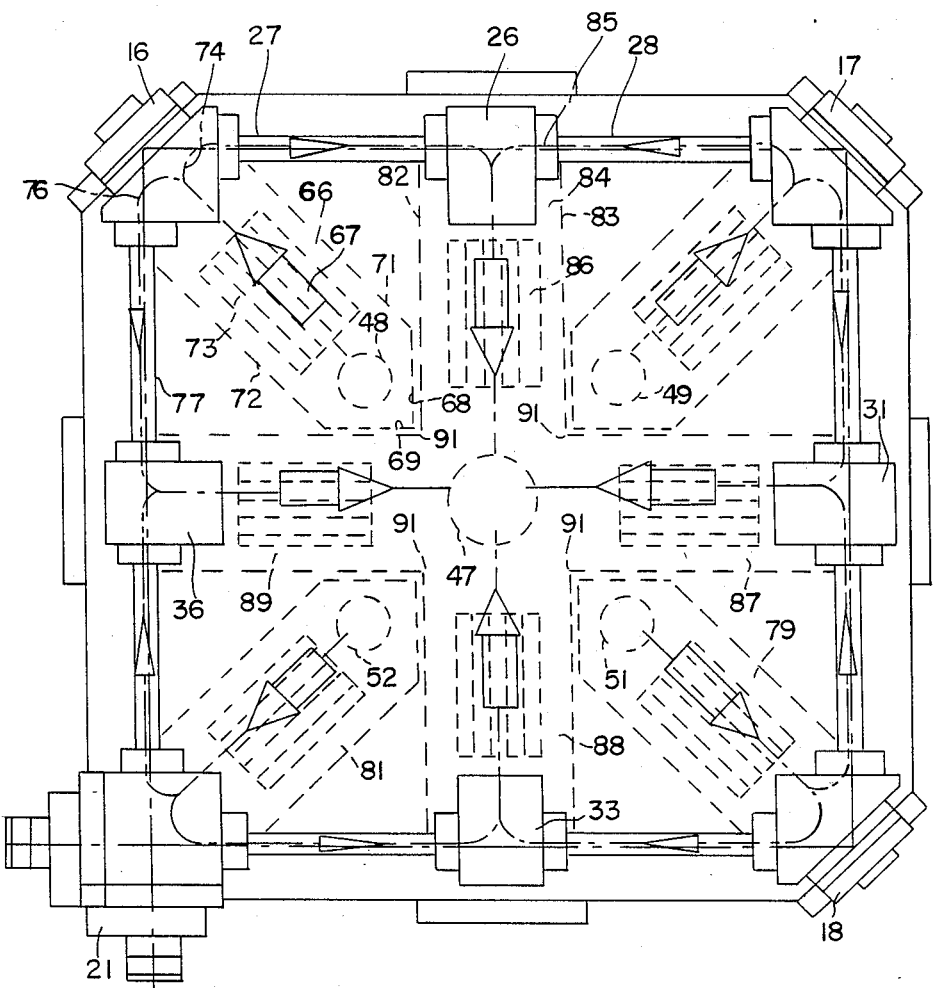
FIG. 2 is a plan view according to FIG. 1 but slightly larger, showing the interior of the table top.
Figure 4:
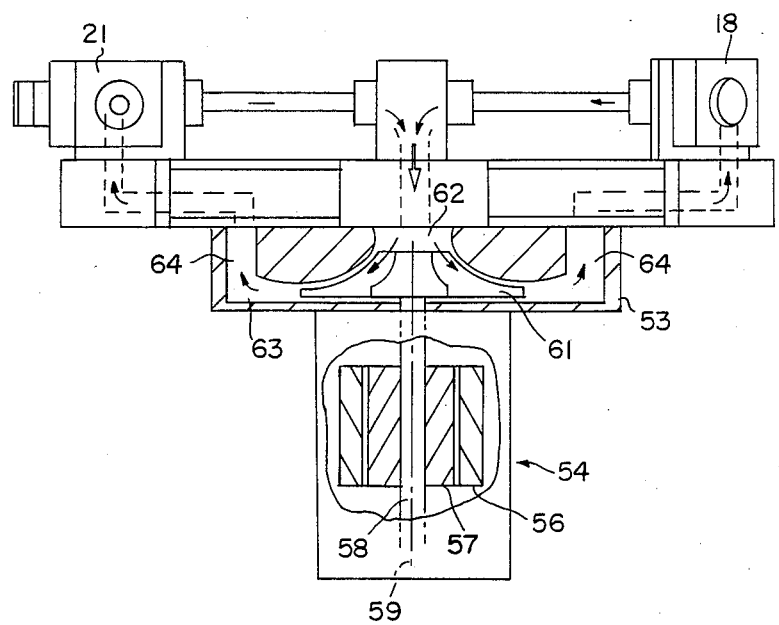
FIG. 4 is a view as in FIG. 3 but enlarged, partially broken away, showing the interior of the engine housing, the blower flange and partial paths, shown by broken lines.

A $CO_2$ laser 11 with an output of 500 W stands on a table 12 to which it is rigidly connected. Provided beneath the table 12 is a turbo-radial blower 13 which is rigidly bolted under the table 12. The device shown in FIGS. 3 and 4 constitutes one unit. It stands on a frame, not shown. The laser has beam paths 14,

I claim:

1. In a $CO_2$ power laser device having beam paths disposed in a rectangle and a plurality of corner zones, and comprising:
   a first corner zone with a first intermediate corner flange that holds in position a first deflecting mirror,
   a second corner zone with a second intermediate corner flange that holds in position a second deflecting mirror,
   a third corner zone with a third intermediate corner flange that holds in position a third deflecting mirror,
   a fourth corner zone with an end flange that holds in position an output mirror and a 180 degree total reflection mirror,
   a first gas pipeline between said first and said second intermediate corner flanges,
   a second gas pipeline between said second and said third intermediate corner flanges, a third gas pipeline between said third intermediate corner flange and said end flange, a fourth gas pipeline between said end flange and said first intermediate corner flange, HF pumping electrodes connected to said gas pipelines for exciting gas that flows in said gas pipelines, a gas supply device for carrying cooled gas to said gas pipelines, a gas drain device for carrying heated gas from said gas pipelines, heat exchange devices for cooling gas that flows in said gas pipelines, a gas pump connected to said gas supply device and to said gas draining device for pumping gas through said gas pipelines, a base device carrying said intermediate corner flanges and said end flange, the improvement wherein:
(a) a through-flange is connected to each of said gas pipelines and sub-divides the gas pipeline to which it is connected into two partial gas pipelines,
(b) said gas pipelines form a right-angled rectangle,
(c) said gas pump is provided approximately at the intersection of diagonals across said corner zones,
(d) at least partial paths of said gas supply device and at least partial paths of said gas drain device are situated in a star-shaped device between said turbo-radial blower and said intermediate corner flanges, through-flanges and end flange, and
(e) said gas pump is a turbo-radial blower that has an axis at a right angle to said star-shaped device, wherein said axis substantially traverses said area of intersection of said diagonals,
(f) said star-shaped device has cavities in which said paths of said gas supply device and said gas drain device extend,
(g) wherein there are provided four partial paths for the supply of gas and four partial paths for gas dispersal, some partial paths extending to said intermediate corner flanges and said end flange and other partial paths extending to said through-flanges, and
(h) said turbo-radial blower is at least indirectly flanged onto said stellate device.

2. Device according to claim 1, wherein said gas pipelines form a square.

3. Device according to claim 1, wherein said partial paths for gas supply go to said intermediate corner flanges and said end flange, and said partial paths for gas dispersal go to said through-flanges.

4. Device according to claim 1, wherein each of said cavities is formed by an upper wall and a lower wall that bounds said paths and gas-tight partitions extending between said upper wall and said lower wall.

5. Device according to claim 4, wherein said turbo-radial blower has one of a pressure chamber and a suction chamber, and one of said upper wall and said lower wall comprises apertures that open out into said partial paths and are connected to said pressure chamber or suction chamber of said turbo-radial blower.

6. Device according to claim 5, wherein a plurality of apertures for partial paths of gas supply lie on one radius and an aperture for gas dispersal lies in the area of intersection of the diagonals.

7. Device according to claim 5, wherein said turbo-radial blower has a rotor and a housing that has an outlet orifice coaxial with said rotor and aligned with said aperture for gas dispersal.

8. Device according to claim 5, wherein said turbo-radial blower has a rotor and a housing that has coaxial with said rotor an overpressure chamber directly aligned with said apertures for gas supply.

9. Device according to claim 1, wherein the flow resistances of said partial paths for gas supply are equal.

10. Device according to claim 1, wherein the flow resistances of said partial paths for gas dispersal are equal.

11. Device according to claim 1, wherein said turbo-radial blower is flanged to said star-shaped device, wherein said axis substantially traverses the area of intersection of said diagonals.

12. Device according to claim 1, wherein said heat exchange devices comprise first heat exchange devices provided in said star-shaped device in partial paths for gas dispersal.

13. Device according to claim 12, wherein said heat exchange devices comprise second heat exchange devices provided in said star-shaped device in partial paths for gas supply.

14. Device according to claim 1, wherein said turbo-radial blower has a rotary speed in the range of about 10,000 to 150,000 rpm, the gas delivery rate being in the range of about 100 m3/h to 2000 m3/h.

15. Device according to claim 14, wherein said rotary speed is in the range of about 40,000 to 100,000 rpm, the gas delivery rate being in the range of about 500 m3/h to 1200 m3/h.

16. Device according to claim 14, wherein in the case of a 500 W laser, said rotary speed is in the range of about 40,000 rpm plus/minus 20%.

17. Device according to claim 1, wherein said CO2 power laser comprises an assembly of components rigidly joined to one another to constitute one unit.

18. Device according to claim 1, wherein said table top is several millimeters thick.

19. Device according to claim 18, wherein the thickness of said table top is in the range of about 50 to 140 mm.

* * * * *